United States Patent [19]
Hicks et al.

[11] Patent Number: 6,052,590
[45] Date of Patent: Apr. 18, 2000

[54] METHOD FOR REDUCING CONTROL CHANNEL SCAN TIME

[75] Inventors: Scott Gordon Hicks, Apex; Richard Michael Abdella, Raleigh; Amish Kirit Shah, Cary, all of N.C.

[73] Assignee: Ericsson, Inc., Research Triangle Park, N.C.

[21] Appl. No.: 08/902,051

[22] Filed: Jul. 29, 1997

[51] Int. Cl.[7] ...................................................... H04Q 7/20
[52] U.S. Cl. .................... 455/434; 455/168.1; 455/161.1
[58] Field of Search ................... 455/434, 168.1, 455/67.1, 161.1, 154.1, 432

[56] References Cited

U.S. PATENT DOCUMENTS

| | | | |
|---|---|---|---|
| 5,734,980 | 3/1998 | Hooper et al. | 455/434 |
| 5,784,693 | 7/1998 | Barber et al. | 455/434 |
| 5,809,419 | 9/1998 | Schellinger et al. | 455/434 |
| 5,845,198 | 12/1998 | Bamburak et al. | 455/154.1 |
| 5,884,182 | 3/1999 | Hoover | 455/434 |

OTHER PUBLICATIONS

"Intelligent Roaming," TR45.3.6/97.04.28.13, Source: AT&T Wireless Services, Inc., 57 pages.

*Primary Examiner*—Edward F. Urban
*Assistant Examiner*—Tilahun Gesesse

*Attorney, Agent, or Firm*—Coats & Bennett, P.L.L.C.

[57] ABSTRACT

An improved band scan method is claimed which allows a mobile unit to more quickly locate appropriate control channels in a wireless communications system operating on a communications spectrum having channel bands. The method includes storing a list of acceptable service providers in the mobile unit, receiving service provider information identifying the service provider for a particular control channel, receiving minimum acceptable signal strength information for the control channel, determining the acceptability of the service provider by comparing the received service provider information against the acceptable service provider list, and, if the service provider is acceptable, comparing the received signal strength for the control channel against the minimum acceptable level. If the control channel is allocated to an unacceptable service provider, the mobile unit terminates the band scan and returns to the procedure invoking the band scan without comparing the received signal strength for the control channel against the minimum acceptable level. By checking the service provider information earlier than in prior art methods, the present method allows for the checking of received signal strength against the minimum acceptable level to be deferred or avoided in many circumstances. The method helps reduce the time required and otherwise increases the efficiency of control channel scanning, particularly in IS-136 cellular telephone systems.

9 Claims, 6 Drawing Sheets

METHOD FOR REDUCING CONTROL CHANNEL SCAN TIME

FIELD OF INVENTION

The present invention relates generally to the communications field and, in particular, to a method for reducing the amount of time and resources required for a mobile unit to find an appropriate communications control channel in wireless communications systems.

BACKGROUND OF THE INVENTION

Wireless communication systems, such as cellular telephone systems, have proved to be very popular. Such systems typically include numerous mobile units (e.g., cellular telephones), a plurality of base stations at fixed locations, and one or more switching centers connecting the wireless communication systems to other communications systems, such as the land line public switched telephone network.

It is common for such systems to employ a large number of discrete communication channels for communicating voice and data from one location to another and for controlling system functions. It is also common for there to be multiple communications service providers in competition with each other for each type of communication service. Further, within a given geographical area, it is typical for the various communication channels to be allocated to the different competitors such that only one service provider is responsible for providing service on any given channel.

To facilitate communications channel allocation, the spectrum of channels may be divided into several channel bands, each containing a plurality of communications channels. Thereafter, an entire channel band is typically allocated to a particular service provider for a given geographic region. Thus, in a certain region, service provider Alpha may be allocated channel bands A and C, while service provider Beta may be allocated channel band B, and service provider Gamma all other channel bands. The particular details of the channel band allocations are well known in the industry.

During use, it is common for the mobile unit to initiate a band scan in order to locate an appropriate control channel. The band scan is a process by which a mobile unit searches through channels in a channel band, looking for an appropriate control channel to camp on. A band scan could be initiated for a wide variety of reasons, including at power-up, at call release, or when a control channel is lost. In some instances, multiple band scans are run back-to-back on different channel bands in what is called a wide-band scan. Because the band scanning process takes time and otherwise utilizes system resources including mobile unit power, it is very desirable for the band scan or wide-band scan to happen as quickly as possible.

SUMMARY OF THE INVENTION

The present invention is an improved method for a mobile unit to locate appropriate control channels in a wireless communications system, such as a cellular telephone system, operating on a communications spectrum having channel bands. The method is an improved band scan method which includes storing a list of acceptable service providers in the mobile unit, receiving service provider information identifying the service provider for a particular control channel, receiving minimum acceptable signal strength information for the control channel, determining the acceptability of the service provider by comparing the received service provider information against the acceptable service provider list, and, if the service provider is acceptable, comparing the received signal strength for the control channel against the minimum acceptable level. If the control channel is suitable, i.e. has sufficient received signal strength, and is allocated to an acceptable service provider, the mobile unit camps on the control channel. If the control channel is allocated to an unacceptable service provider, the mobile unit stores the received service provider information, the channel number, and the channel band and then returns to the band scan invoking procedure. By checking the service provider information early, the method allows for the checking of received signal strength against the minimum acceptable level to be deferred or avoided. Thus, the method reduces the time required to locate appropriate control channels in some situations and otherwise increases the efficiency of control channel scanning. The method is particularly useful in IS-136 cellular telephone systems.

DETAILED DESCRIPTION OF THE PREFERRED EMBODIMENT

Figure 1:
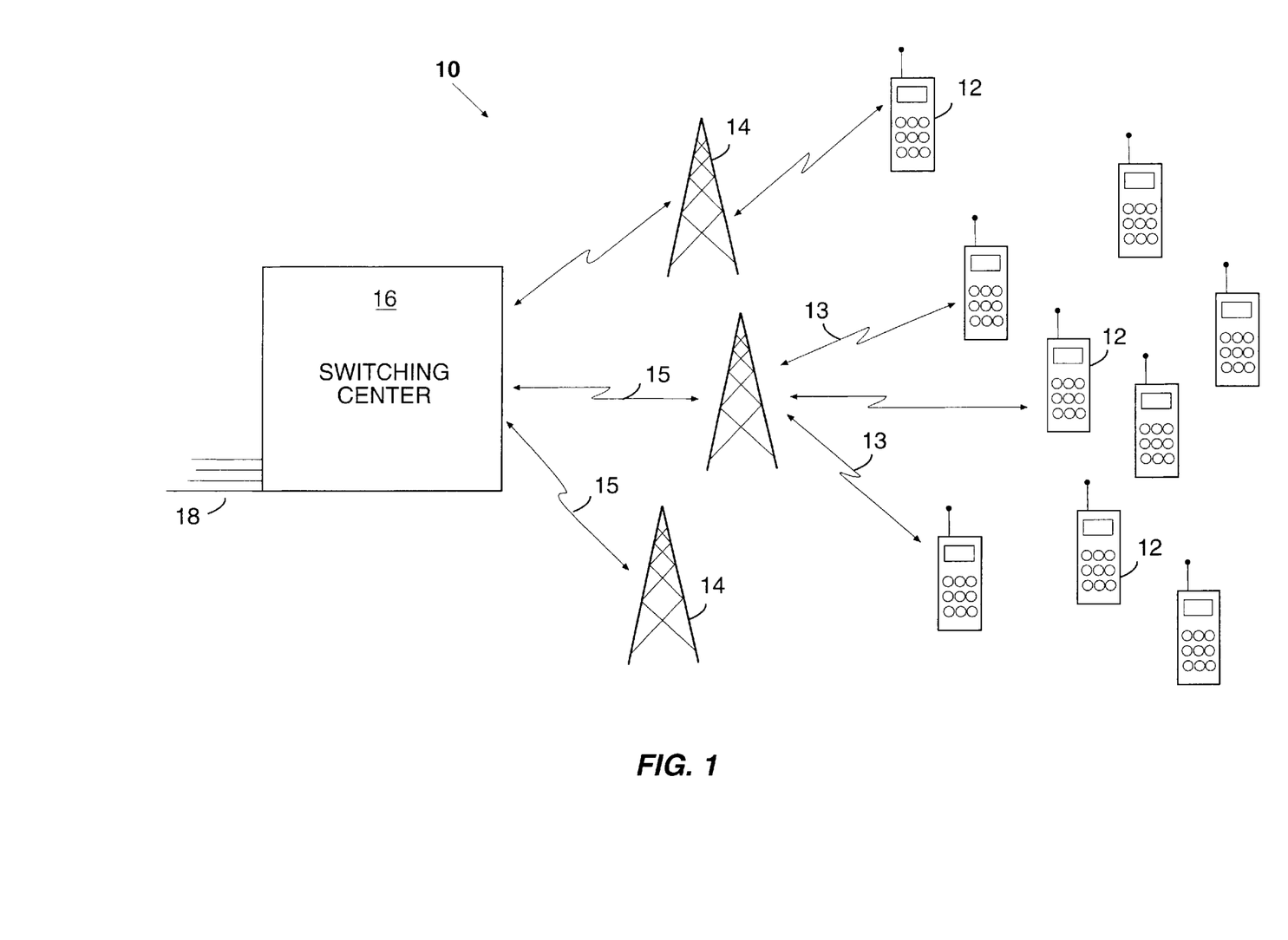
FIG. 1 is a simplified representation of a cellular telephone wireless communications system.

A wireless communications system 10 typically includes numerous mobile units 12 (e.g., cellular telephones), a plurality of base stations 14, and one or more switching centers 16 connecting the wireless communications system 10 to other communications systems 18, such as the public switched telephone network (see FIG. 1). Typically, the mobile units 12 communicate with the base stations 14 using radio links 13. Likewise, the base stations 14 typically communicate with the switching center 16 via radio links 15.

Figure 2:
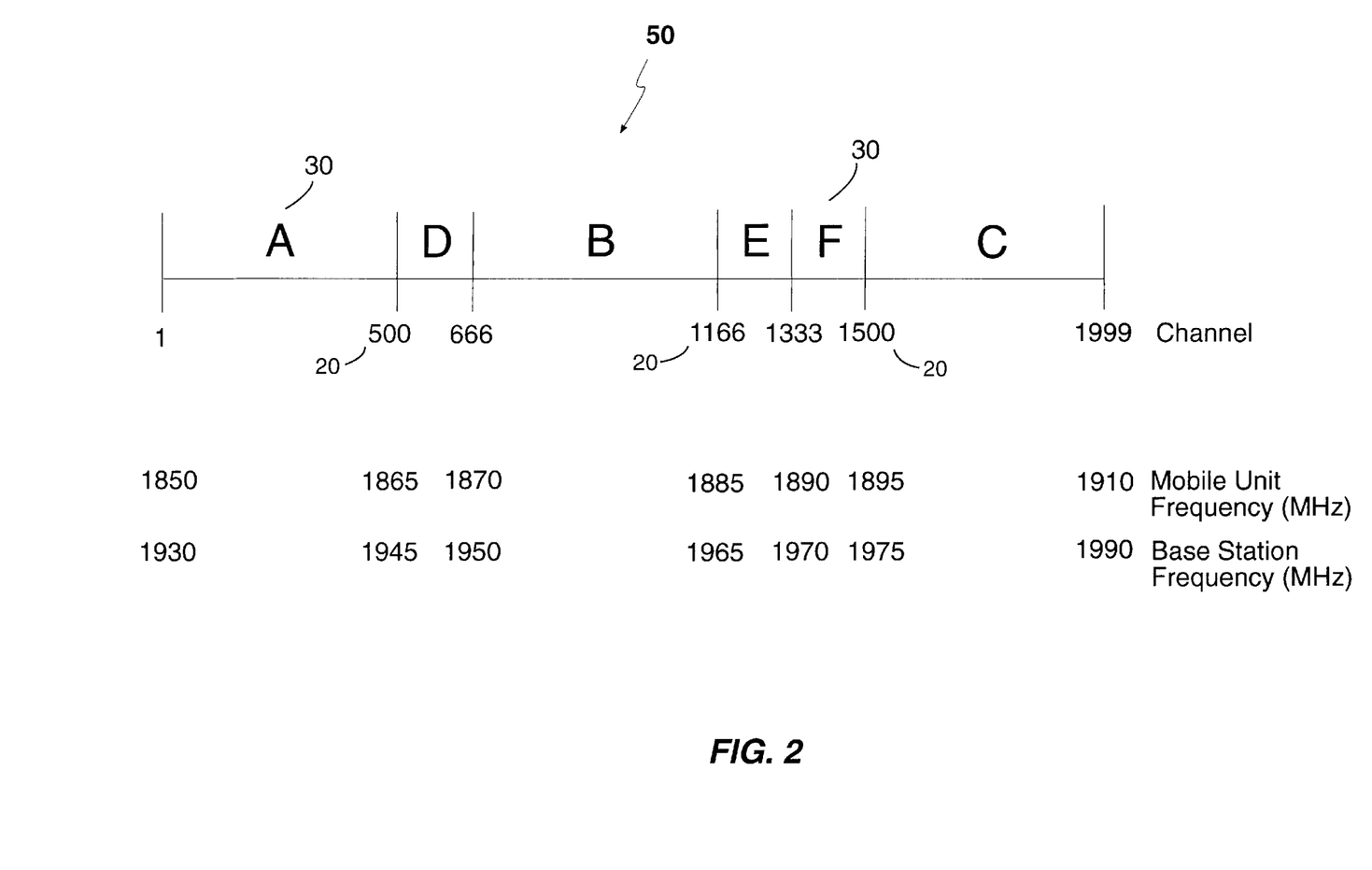
FIG. 2 is an example of a typical communications spectrum organization showing channel bands.

The radio links 13 typically include numerous discrete communications channels 20 on one or more communications spectrums 50 (see FIG. 2). A communications channel 20 is typically a pair of frequencies, one transmit and one receive, used by a mobile unit 12 to communicate within a wireless communications system 10. Some communications channels 20 are for control functions (control channels) while others are for voice and data communications (traffic channels). Examples of control functions include locating a particular mobile unit 12, establishing a new communications session, and transferring oversight of a communications session from one base station 14 to another.

A wireless communications system 10 may utilize more than one communications spectrum 50. For instance, one spectrum 50 may be in the 800–900 MHz range while another may be in the 1850–2000 MHz range. For simplicity, the following description will discuss only one spectrum 50, but it is to be understood that the invention also includes the use of multiple spectrums 50.

A plurality of communications service providers typically compete in providing wireless communications service on a particular communications spectrum 50. It is customary for these different service providers to be allocated portions of the communications spectrum 50 called "channel bands" 30. FIG. 2 shows a communications spectrum 50 divided into six channel bands (A–F) 30, each comprised of a plurality of communications channels 20. As shown in FIG. 2, each communications channel 20 in the spectrum 50 has a channel number and is composed of a specific mobile unit-base station frequency pair. Also as shown in FIG. 2, each communications channel 20 is assigned to a specific channel band 30.

Each channel band 30 typically includes both control channels and traffic channels, with the particular assignment of a given communications channel 20 to these categories possibly changing from service provider to service provider and/or from area to area. In addition, different channel bands 30 may include different quantities of control channels and traffic channels.

The spectrum 50 of FIG. 2 represents the 1900 MHz spectrum of the Telecommunication Industry Association's interim standard IS-136 and is illustrative of a common method of structuring a communications spectrum 50. The spectrum structure of FIG. 2 forms the basis for the description herein; however, other communications spectrum 50 organizations are possible. The present invention is intended to work with any communications spectrum 50 structure that utilizes a band or grouping approach with predetermined assignment of communication channels 20 to bands or groups where there is only one service provider per channel band 30.

It is also common to further subdivide the channel bands 30 into sub-bands, where each sub-band contains one or more communications channels 20. For purposes of illustration only, this description will assume that each channel band 30 of FIG. 2 is divided into 2.5 MHz sub-bands. In this arrangement, each sub-band contains approximately eighty-three communications channels 20.

The channel bands 30 are allocated as units to various service providers in a given area such that only one service provider is responsible for providing service on all the communications channels 20 in any given channel band 30 in a given area. Thus, service provider Alpha in a certain region may be allocated channel bands A and C, while service provider Beta may be allocated channel band B, and service provider Gamma all other channel bands 30.

For a particular mobile unit 12, the various service providers may be divided into three broad classifications: preferred, swing, and disfavored. The preferred classification includes service providers that are most desirable for communications. Such service providers are known as "acceptable" service providers. The disfavored classification includes service providers that should be used for communications only in emergencies and/or if no acceptable service providers are available. Such service providers are known as "unacceptable" service providers. The swing classification includes service providers that can be either "acceptable" or "unacceptable" depending on various settings known in the art.

It is common in wireless communications systems 10 for mobile units 12 to contain a programmable Intelligent Roaming Database (IRDB). The IRDB contains information that the mobile unit 12 uses during scanning operations. This information typically includes a listing of preferred service provider identification codes, a listing of disfavored service provider identification codes, a listing of swing service provider identification codes, a band search list, and various other control information. The IRDB is commonly stored in semi-permanent memory in the mobile unit 12. That is, the IRDB is stored in the mobile unit 12 even while the mobile unit 12 is not in use, but the contents of the IRDB can be changed by the wireless communications system 10, possibly through over-the-air programming, or by an authorized technician. The mobile unit 12 user is typically not able to program the IRDB independently.

In practice, the IRDB is usually supplemented by the Number Assignment Module (NAM). The NAM is programmable memory containing specific information about a mobile unit 12 such as the electronic serial number, phone number, and the like. Like the IRDB, the NAM is semi-permanent memory. However, it should be noted that the electronic serial number portion of the NAM is typically only programmable by the mobile unit's 12 manufacturer due to "cloning" concerns. The NAM also contains the identification code for the mobile unit's 12 home service provider. For simplicity of discussion, the NAM will be considered part of the IRDB.

From time to time in wireless communications systems 10, the mobile unit 12 may initiate a band scan procedure. Examples of events which may trigger a band scan include call release without a valid control channel 20 assignment, radio link failure, and power-up. A band scan is a search through a channel band 30 for a suitable control channel 20, i.e., one having adequate signal characteristics; preferably, the suitable control channel 20 is allocated to an "acceptable" service provider. Ideally, a band scan results in the mobile unit 12 registering with an "acceptable" service provider as quickly as possible. In some instances, multiple band scans are run back-to-back on different channel bands 30 in what is called a wide-band scan. In a wide-band scan, it is typical for the mobile unit 12 to search through channel bands 30, usually in the order specified by the band search list of the IRDB, until a suitable control channel 20 is located for an "acceptable" service provider. In addition, the mobile unit 12 stores information about "unacceptable" control channels 20 encountered during the wide-band scan in case no "acceptable" service providers are encountered by the conclusion of the wide-band scan. In such a situation, the mobile unit 12 will typically run a procedure known as a "rescan" in an attempt to camp on a suitable control channel 20 of an "unacceptable" service provider, preferably based on some preferential ranking of "unacceptable" service providers known in the art. The method of the present invention is not intended to be used during the rescan process.

In a broad sense, the band scan is accomplished by scanning channel sub-bands, searching for control channels 20 of "acceptable" service providers with adequate signal characteristics. In this process, the service provider identification code which is broadcast on a control channel 20 is compared against the IRDB to determine whether the service provider is "acceptable" or "unacceptable."

Figure 3:
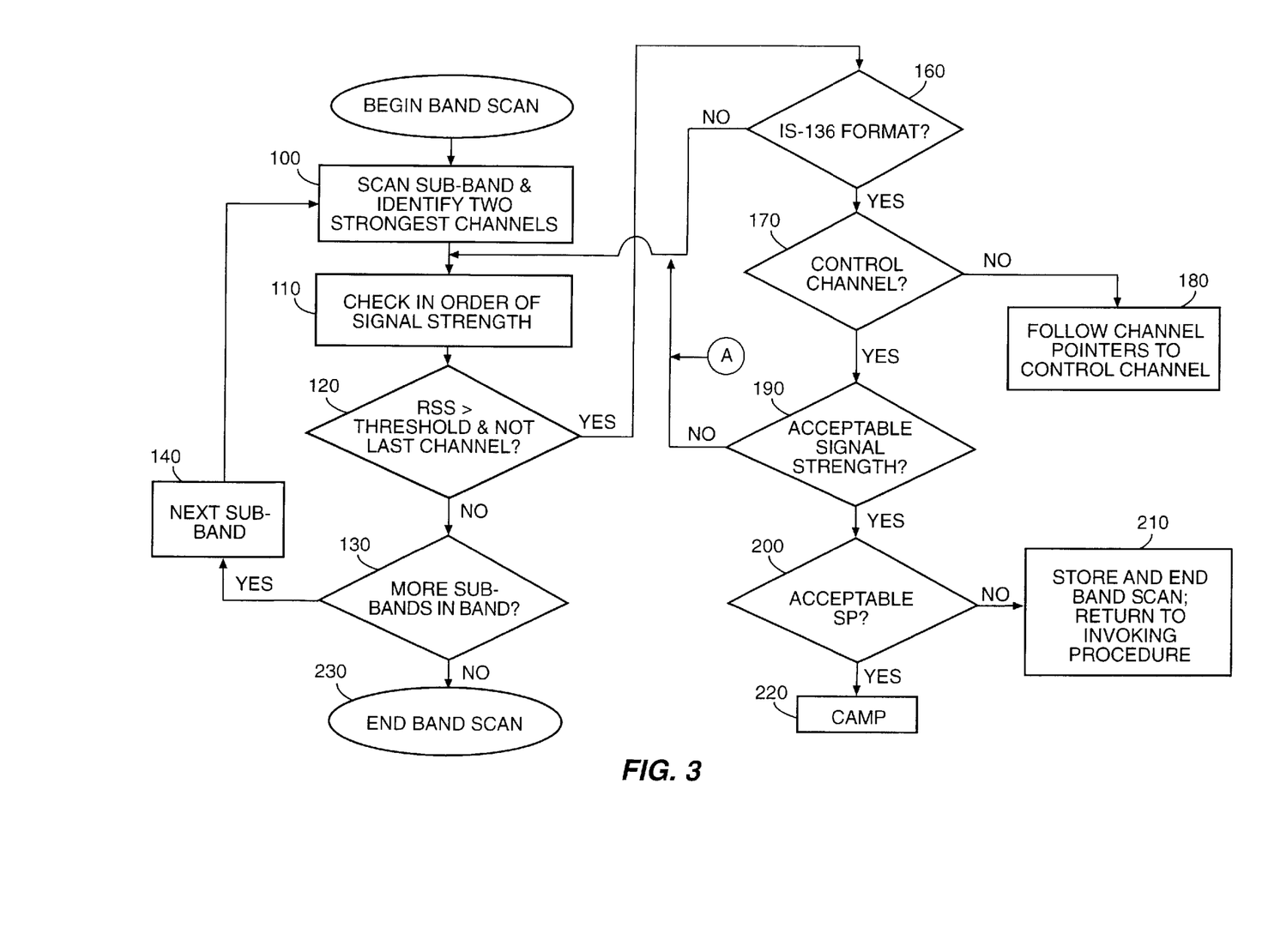
FIG. 3 is a simplified logic flow diagram of the prior art.

Referring to FIG. 3, the prior art band scan process for scanning a channel band 30 is shown. The band scan process includes the main process shown in FIG. 3 and the channel pointer trace process shown in FIG. 3A. For the main process, the sub-band is first scanned to identify the two strongest channels from a signal strength perspective (box 100). The two strongest channels are identified (box 100) and checked in order of signal strength (box 110). The Received Signal Strength (RSS) of the channel 20 is checked against a pre-determined threshold (box 120). If the channel 20 does not have a RSS above the threshold and the other channel 20 has not been checked, the next channel 20 is checked (box 110). If the last channel 20 does not have a RSS above the threshold and there are more sub-bands in the channel band 30 (box 130), then the next sub-band is scanned (box 140).

If the channel 20 has a RSS above the threshold, then the channel 20 is checked to see if it is in IS-136 format (box 160). If not, then the process loops back to check the next channel 20 (i.e., the second strongest channel 20 in the sub-band) (box 110) or the next sub-band (if the second channel 20 has already been checked)(box 130). If the channel 20 is in IS-136 format, the channel 20 is checked to see if it is a traffic channel or a control channel (box 170). If the channel 20 is a traffic channel, then the digital control channel locator information is used to locate a control channel 20 in a channel pointer trace process (box 180, see FIG. 3A discussed later).

Next, the F-BCCH message of the control channel 20 is decoded. The F-BCCH is a logical channel which is used to broadcast DCCH structure parameters and other information essential for accessing the wireless communications system 10. In particular, encoded within the F-BCCH message, in a manner well known in the art, are several parameters relating to minimum allowable RSS and service provider identification. For typical IS-136 systems, these parameters include RSS_ACC_MIN (minimum received signal level required to access base station 14), MS_ACC_PWR (maximum nominal power that the mobile unit 12 may use when first accessing base station 14), SID (service provider information or system identity), and, if present, SOC (system operator code).

The channel signal strength is compared against the minimum allowable RSS as determined by the F-BCCH message (box 190) to determine whether the channel 20 is suitable or not. The minimum allowable RSS level is typically significantly higher than the pre-determined threshold allowed at box 120. If the channel 20 fails, then the process loops back to check the next channel 20 (i.e., the second strongest channel 20 in the sub-band) (box 110) or the next sub-band (if the second channel 20 has already been checked) (box 130). If the channel 20 passes, the channel is determined to be suitable, and the service provider information is checked (box 200).

If the service provider is from the "acceptable" class, then the mobile unit 12 camps on the control channel 20 (box 220). If the service provider is from the "unacceptable" class, the mobile unit stores the channel number, ends the channel band scan, and returns to the invoking procedure (box 210).

If at any point, the next sub-band should be checked but there remain no further sub-bands to check, the band scan ends and the process returns to the invoking procedure (box 230).

In the above discussion, the channel pointer trace process for locating a control channel 20 is represented by box 180. A fuller explanation of the channel pointer trace process is given in FIG. 3A. In practice, channel pointers in a IS-136 system point to a plurality of channels 20, at least one of which should be a control channel 20. A mobile unit processing through box 180 would scan the channels indicated by the channel pointer (box 181). Then, much like in box 110 and box 120, the channels 20 are checked in order of RSS (box 182) for RSS above the predetermined minimum threshold (box 183). This threshold is the same as in box 110. If the RSS of the channel 20 is not more than the threshold, the channel pointer trace process returns to the main process to check the next channel 20 (i.e., the second strongest channel 20 in the sub-band) (box 110) or the next sub-band (if the second channel 20 has already been checked) (box 130) as indicated by circle A. If the RSS is above the threshold, the channel being checked is then examined to determine whether it is a traffic channel or a control channel (box 184). However, unlike with box 170, if the channel 20 is a traffic channel, its channel pointers are not followed; instead the channel 20 is discarded and the next channel 20 is checked (box 182). Once a control channel is located, the channel signal strength is compared against the minimum allowable RSS as determined by the F-BCCH message (box 186) to determine whether the channel 20 is suitable or not. This process the same as described for box 190 above with the modification that if the channel 20 is not suitable, the process continues checking other channels 20 indicated by the channel pointers (box 182). If the channel 20 is suitable, the service provider information is checked (box 189). This step is the same as in box 200 above with the modification that if the channel 20 is not suitable, the process continues checking other channels 20 indicated by the channel pointers (box 182). Thus, the channel pointer trace process of box 180 is much like a modified nested version of the main process loop represented by boxes 100–220 in FIG. 3 where a) typically more than two channels are checked, b) IS-136 format is not rechecked, and c) additional channel pointers are not followed.

As an example or the prior art method, assume that the channel band 30 to be searched has seven sub-bands and the strongest two channels in each sub-band are IS-136 control channels. Further, assume that all channels within the band have RSS above the box 120 threshold, but the control channels in the first six sub-bands have RSS below the minimum allowable level as determined by the F-BCCH message, while the control channels in the seventh sub-band are above that level. Last, assume that the F-BCCH message for each control channel 20 is identical. The process of FIG. 3 would scan the first sub-band to identify the two strongest channels (box 100), check the strongest for IS-136 format (box 160), then for control/traffic channel identity (box 170), and then decode the F-BCCH message to determine if the received signal strength is sufficient (box 190). Because it is not, the process will loop back and repeat itself for the second strongest channel 20 in the first sub-band (box 110). The process would continue looping through the boxes 100–190, checking two channels 20 in each sub-band, until the seventh sub-band's channels are reached, or more particularly, the strongest channel 20 in sub-band seven. This is because only the control channels in sub-band seven have high enough RSS (box 190) and therefore can proceed to box 200. Finally, the service provider information will be checked against the IRDB (box 200). If the service provider is "acceptable," the mobile unit 12 will camp on the control channel 20 (box 220). If the service provider is "unacceptable," the mobile unit 12 will store the channel number, end the channel band scan, and return to the invoking procedure (box 210).

In this example, a total of thirteen channels were checked before the acceptability of the service provider was determined. In addition, seven sub-bands had to be completely scanned so that the strongest two channels in each sub-band could be determined. Such scanning and checking takes time and uses mobile unit resources such as battery power.

In order to improve band scan efficiency, the method of the present invention takes advantage of the fact that all the control channels 20 in a single channel band 30 originate from a common service provider to increase band scan efficiency. The present invention increases efficiency by checking the service provider information (box 200) before the RSS is checked against the requirements dictated by the F-BCCH message (box 190). By doing so, the present method decreases the amount of time required to perform a wide-band scan in many circumstances. Further, the method of the present invention allows the scanning of some communications channels 20 in channel bands allocated to "unacceptable" service providers to be either avoided entirely or postponed until a later rescan process.

Figure 3A:
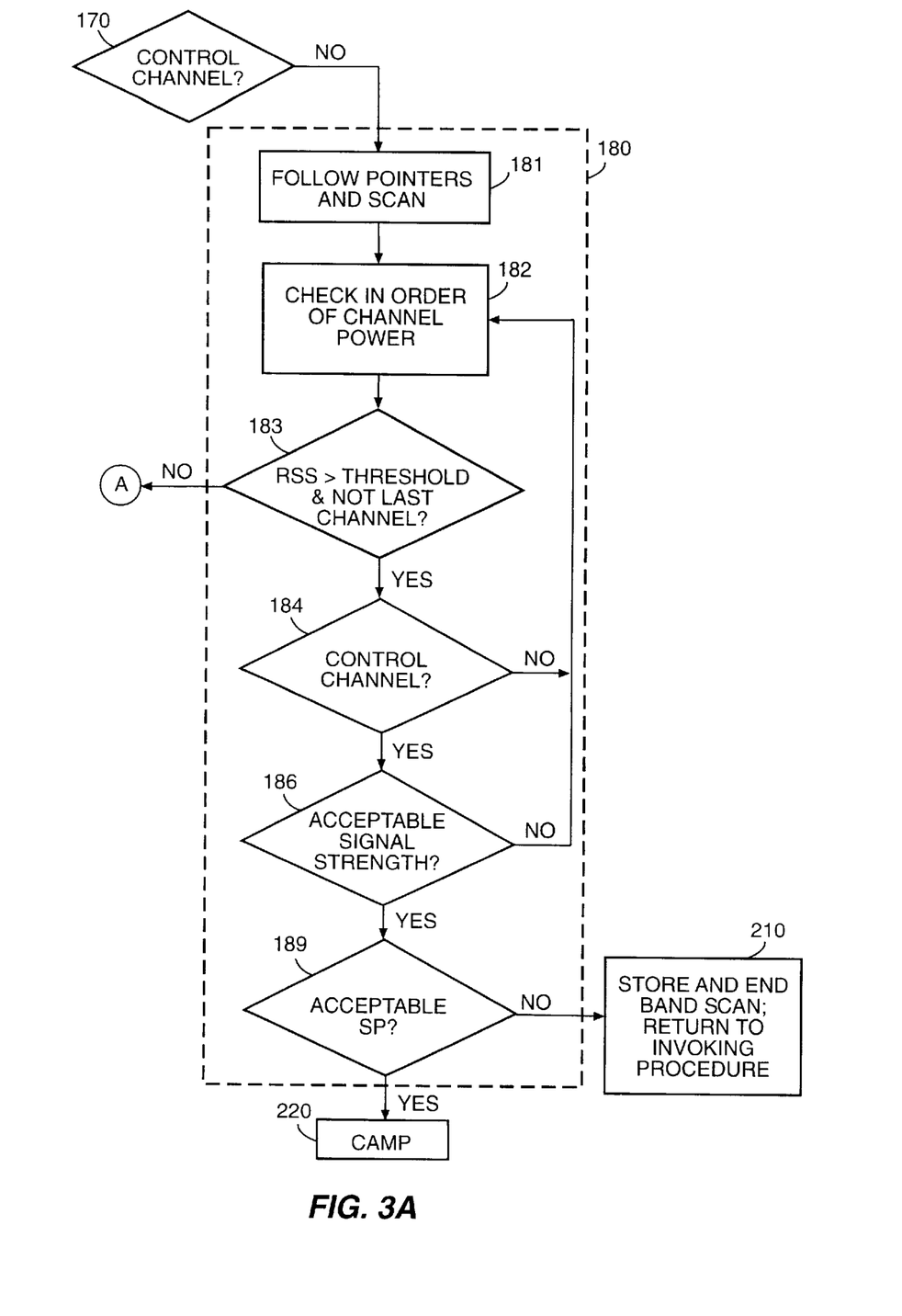
FIG. 3A is a simplified logic flow diagram of the prior art showing a channel pointer trace process.
Figure 4:
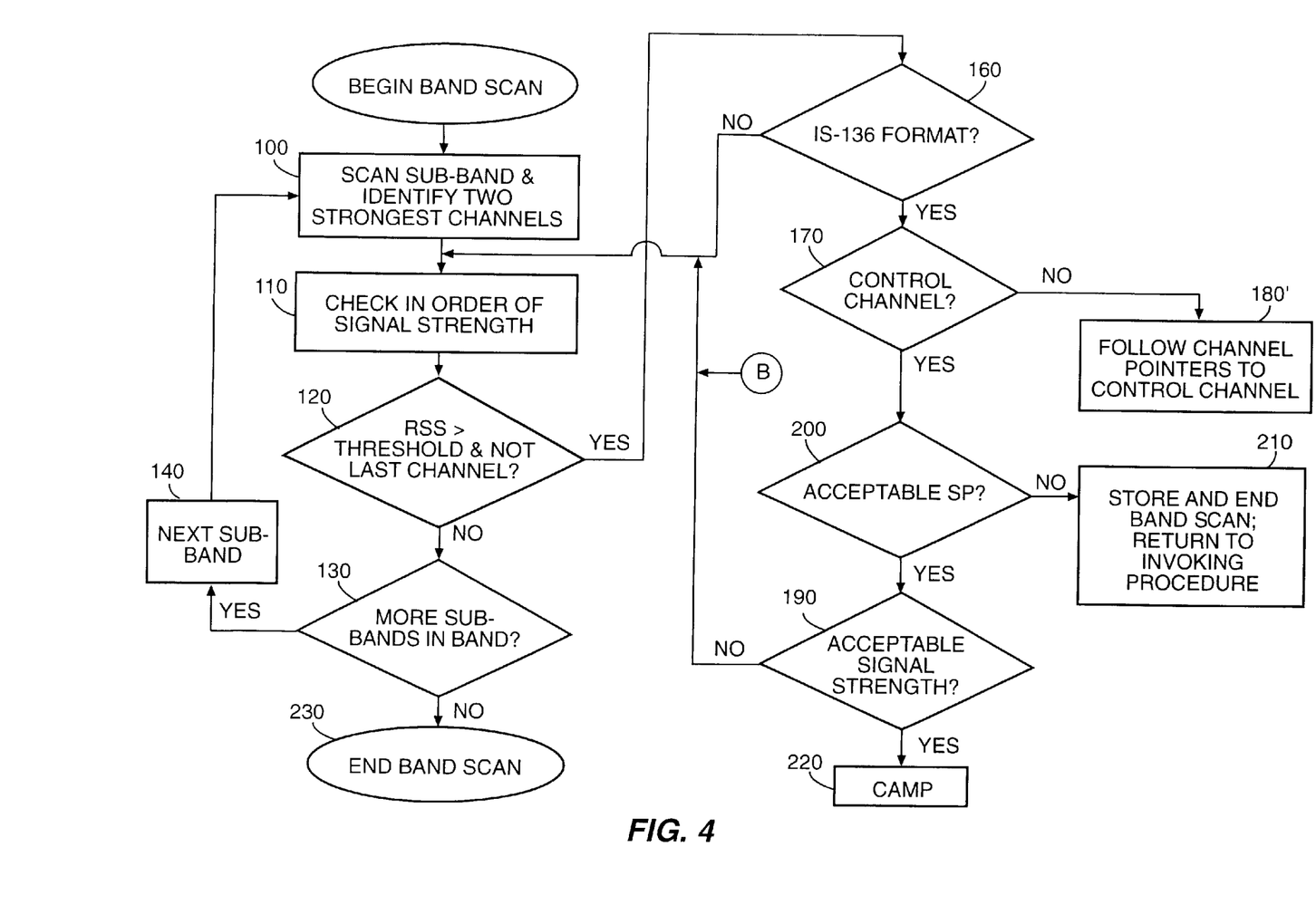
FIG. 4 is a simplified logic flow diagram of the present invention.
Figure 4A:
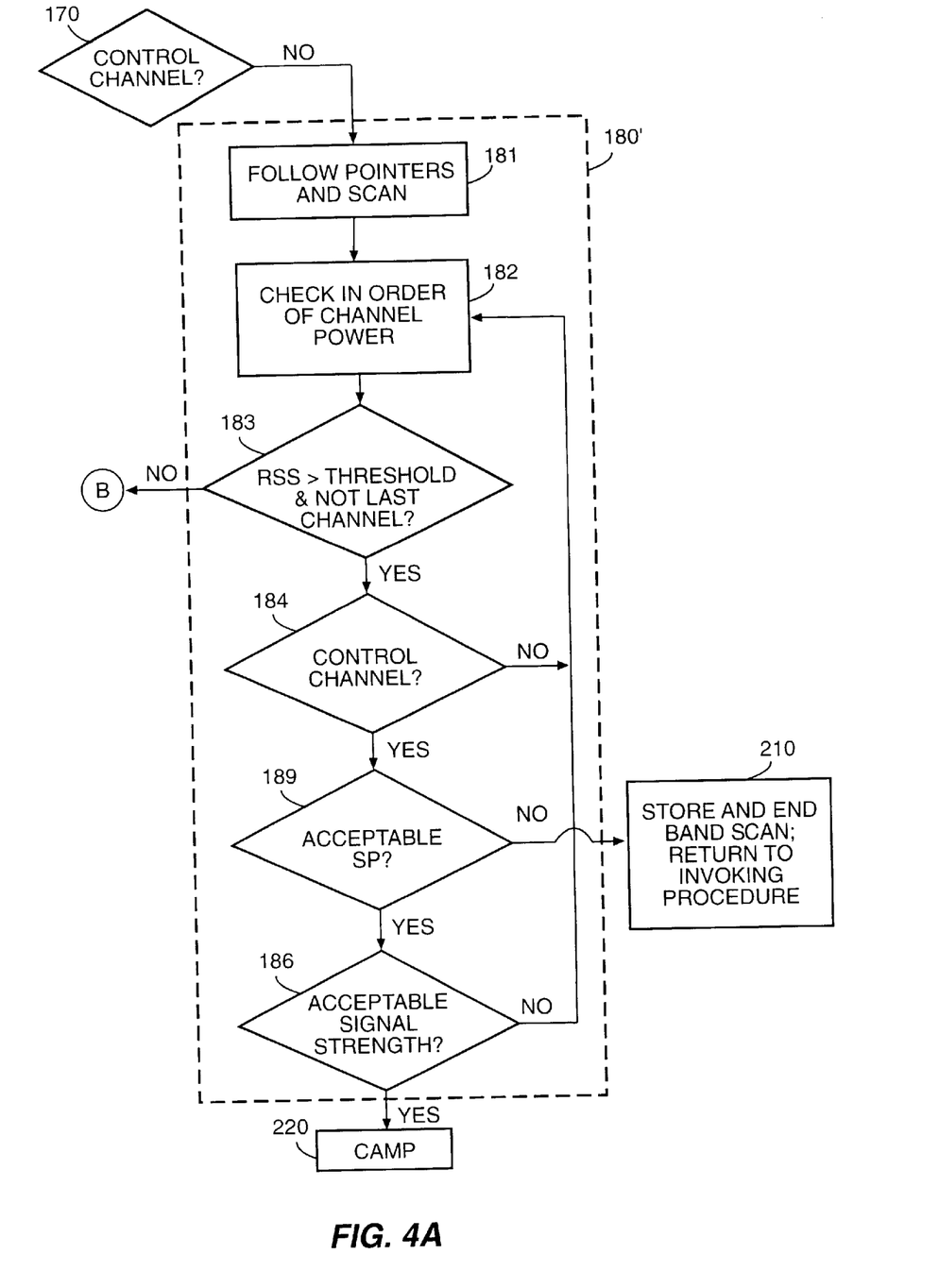
FIG. 4A is a simplified logic flow diagram of the present invention showing a modified channel pointer trace process.

The improved band scan method is shown in FIG. 4 and the associated improved channel pointer trace process is shown in FIG. 4A. The reference numbers from FIG. 3 and FIG. 3A have been retained where appropriate.

As can be seen in FIG. 4, the present method checks the service provider information against the IRDB (box 200) before checking the RSS against that prescribed by the F-BCCH message (box 190). In this method, as in the prior art, the F-BCCH message must be decoded before the actions of boxes 190 and 200 can be performed. However, because the service provider identification should be the same for all control channels in the channel band 30, while the RSS may change from channel 20 to channel, checking the service provider information (box 200) earlier, rather than later is more efficient.

Likewise, the present method modifies the channel pointer trace process represented by box 180'. As can be seen in FIG. 4A, the method represented by box 180' is a modified version of the method of box 180 (see FIG. 3A) wherein the service provider information is checked against the IRDB (box 189) before checking the RSS against that prescribed by the F-BCCH message (box 186).

For example, assume the same conditions as described in the previous example. The process of FIG. 4 would scan the first sub-band to identify the two strongest channels (box 100), check the strongest for IS-136 format (box 160), then for control/traffic channel identity (box 170), and then decode the F-BCCH message. At this point, the present method will compare the service provider information against the IRDB (box 200). If the service provider is "unacceptable," the mobile unit 12 will not check the received signal strength against the F-BCCH parameters (box 190), nor will it check additional sub-bands in the channel band 30 (box 130). Instead, the present method stores the channel number, ends the channel band scan, and returns to the invoking procedure (box 210).

Only if the service provider is "acceptable" will the present method check the received signal strength against the requirements from the F-BCCH message (box 190). If the channel 20 is suitable for camping, the mobile unit 12 will camp on the channel 20 (box 220). If the channel 20 is not suitable for camping, the mobile unit 12 will proceed with checking the other strong channel 20 in the sub-band (box 110) and/or other sub-bands (box 130), as indicated by circle B.

In this example, the present method reduces the number of channels checked from thirteen to one before the suitability of the service provider was determined. As such, the time and resources expended to find an appropriate control channel 20 are significantly reduced.

A quicker determination of the acceptability of the service provider for a given channel band 30 is very useful in reducing wide-band scan time. When the initial channel band(s) 30 scanned are allocated to "unacceptable" service providers, the present inventive method has the potential to greatly reduce wide-band scan time. For instance, assume that IRDB band search list contains the channel bands 30 of FIG. 2 in the sequence of A,B,C,D,E,F and that all channel bands 30 have the signal strength characteristics described above. Further, assume that channel bands A and B are allocated to "unacceptable" service providers, and channel band C is allocated to an "acceptable" service provider. In such a situation, the present method would decrease the number of channels checked from thirty-nine to fifteen before the mobile unit 12 would be able to camp on an "acceptable" service provider's control channel 20 in a wide-band scan. Further, the present method would decrease the number of communications channels 20 scanned from fifteen hundred (1500) to six hundred sixty-six (666). This time and resource savings from the increased efficiency of the present improved method increases overall system performance and user satisfaction.

For clarity, the descriptive examples above assume that all channels 20 encountered are IS-136 format control channels. If the channels 20 encountered are instead IS-136 traffic channels, the channel pointer trace process of Box 180 or Box 180' would be followed when appropriate after box 170. Because the improved method of box 180' also checks service provider information (box 189) earlier rather than later, similar increases in efficiency as seen in the main process are expected to result.

The description above has assumed that the wireless communications system 10 is a IS-136 digital cellular telephone network; however, the present inventive method of reducing scan time also functions in other wireless communications environments where communications service providers are assigned channel bands 30, or their equivalents, as a unit.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method for a mobile unit to identify an appropriate control channel in a wireless communication system operating on a communications spectrum having a plurality of channel bands, each served by a single communications service provider, comprising:
   a) storing a list of acceptable service providers in said mobile unit;
   b) receiving service provider information identifying the service provider for a particular control channel;
   c) receiving, at the mobile unit, minimum acceptable signal strength information for said control channel from a remote location;
   d) determining the acceptability of said service provider by comparing the received service provider information against said list;
   e) thereafter comparing received signal strength for said control channel against said minimum acceptable signal strength information, if said service provider is determined to be acceptable;
   f) wherein steps b through e occur during a single power-up cycle of the mobile unit.

2. The method of claim 1 further comprising the step of storing a list of unacceptable service providers in said mobile unit.

3. The method of claim 1 wherein said control channel has a channel number and said channel band has an identification, and further comprising, if the service provider is not acceptable, the steps of:

a) storing said received service provider information;

b) storing the channel number of said control channel;

c) storing said channel band identification.

4. The method of claim 3 further comprising the step of returning to an invoking procedure.

5. The method of claim 1 further comprising the step of determining the acceptability of said received signal strength, and, if the received signal strength is acceptable, camping on said control channel.

6. The method of claim 1 wherein swing service providers are treated as acceptable service providers.

7. The method of claim 1 wherein said wireless communications system is a IS-136 system.

8. A method for a mobile unit to identify an appropriate control channel in a wireless communication system operating on a communications spectrum having a plurality of identified channel bands, each served by a single communications service provider and having control channels identified by a channel number, comprising:

a) storing a list of acceptable service providers in said mobile unit;

b) storing a list of unacceptable service providers in said mobile unit;

c) receiving service provider information identifying the service provider for a particular control channel;

d) receiving, at the mobile unit, minimum acceptable signal strength information for said control channel from a remote location;

e) determining the acceptability of said service provider by comparing the received service provider information against said list;

f) thereafter comparing received signal strength for said control channel against said minimum acceptable signal strength information, if said service provider is determined to be acceptable;

g) determining the acceptability of said received signal strength, and, if the received signal strength is acceptable, camping on said control channel;

h) storing said received service provider information and the channel number of said control channel and said channel band identification, if the service provider is not acceptable;

i) returning to an invoking procedure, if the service provider is not acceptable;

wherein swing service providers are treated as acceptable service providers and wherein steps c through i occur during a single power-up cycle of the mobile unit.

9. The method of claim 8 wherein said wireless communications systems is a IS-136 system.

* * * * *